United States Patent [19]

Durand et al.

[11] 4,215,207
[45] Jul. 29, 1980

[54] PROCESS FOR THE POLYMERIZATION AND COPOLYMERIZATION OF ETHYLENE, USING A GAS INJECTION DEVICE

[75] Inventors: Pierre Durand, Neuilly sur Seine; Pierre Charlon, Paris; Guy Jouffroy, Lillebonne, all of France

[73] Assignee: Societe Chimique des Charbonnages-CdF Chimie, Paris, France

[21] Appl. No.: 692,380

[22] Filed: Jun. 3, 1976
(Under 37 CFR 1.47)

[30] Foreign Application Priority Data

Jun. 3, 1975 [FR] France ................. 75 17317

[51] Int. Cl.$^2$ ................. C08F 10/02
[52] U.S. Cl. ................. 526/64; 526/65; 526/68; 526/73; 526/84; 526/352.2; 528/483
[58] Field of Search ........ 526/64, 65, 68, 73, 526/84, 352.2; 528/483

[56] References Cited

U.S. PATENT DOCUMENTS

| | | | |
|---|---|---|---|
| 3,372,154 | 3/1968 | Turner et al. | 528/498 |
| 3,373,148 | 3/1968 | Mackie et al. | 526/64 |
| 3,509,115 | 4/1970 | French | 528/483 |
| 3,719,643 | 3/1973 | Knight | 526/65 |
| 3,719,648 | 3/1973 | Frielink | 528/483 |
| 3,976,631 | 8/1976 | van der Molen et al. | 526/64 |

FOREIGN PATENT DOCUMENTS

| | | |
|---|---|---|
| 2341602 | 9/1977 | France. |
| 1039911 | 8/1966 | United Kingdom ........ 526/68 |

OTHER PUBLICATIONS

Trading Paper of Process Equipment Development Co.

*Primary Examiner*—Alan Holler
*Attorney, Agent, or Firm*—Finnegan, Henderson, Farabow, Garrett & Dunner

[57] ABSTRACT

Process and device for cooling a mixture of polymer and monomer from a reactor in which ethylene is polymerized or copolymerized at a pressure greater than 1,000 bars between a pressure-reduction valve located downstream of the reactor and a medium pressure separator. The cooling is achieved by injecting monomer at a pressure below that of the separator using a device with a nozzle cross-section $S_1$ through which the mixture from the reactor passes, a convergent mixing zone in which the mixture is mixed with the monomer injected, which is supplied at a flow rate q, and a diffuser of throat cross-section $S_3$, which makes it possible to bring the mixture to the pressure of the separator. The dimensions of the device are such that the ratio $Q/S_1$ is between 0.20 and 1.35 t/hr.mm2 and the ratio $(q+Q)/S_3$ is between 0.1 and 0.3 t/hr.mm2.

10 Claims, 3 Drawing Figures

PROCESS FOR THE POLYMERIZATION AND COPOLYMERIZATION OF ETHYLENE, USING A GAS INJECTION DEVICE

The present invention relates to an improved process for the polymerisation and copolymerisation of ethylene under a pressure greater than 1,000 bars. More precisely, it relates to a process which makes it possible to cool the mixture of polymer and monomer(s) coming from the reactor before it enters the medium pressure separator, as well as to a device for carrying out this process.

In the conventional scheme of manufacture of polyethylene under a pressure greater than 1,000 bars, the mixture of ethylene and polyethylene coming from the reactor undergoes a reduction in pressure in a valve before being passed into a separator which operates at a medium pressure generally between 200 and 500 bars. This reduction in pressure is accompanied by a rise in temperature which can exceed 20° C.; modifications which are detrimental to the properties of the polymer may take place in the separator if its temperature is too high. To avoid these undesirable modifications, which can go as far as degradation in the case of ethylene/vinyl acetate copolymers, it is advantageous to carry out the separation at a temperature below that which results from the reduction in pressure of the mixture between the reactor and the separator. This problem can be resolved in at least two ways; a first method consists in interposing an exchanger between the reactor and the separator, but firstly this solution entails expensive investment and secondly it presents additional safety problems because of the risk of plugging by the polymer. A second method consists in injecting fresh and/or recycled ethylene, at a pressure greater than that of the separator, between the reactor and the separator; the gas to be injected can be taken from the primary compressor output in the case of fresh gas, or downstream from an exchanger of the recycling circuit in the case of gas recycled under medium pressure (200 to 500 bars).

This latter method is used in British Pat. No. 1,338,280 according to which on injecting, at the pressure-reducing valve located downstream from a tubular reactor, a mixture of fresh ethylene and recycled ethylene under a pressure of 200 to 350 bars, the optical properties of the resin are improved whilst the length of the reactor is reduced. Also, U.S. Pat. No. 3,509,115 proposes, in the case of ethylene/vinyl acetate copolymers, to introduce feed ethylene under a pressure greater than that of the separator. The injection at a pressure greater than that of the separator requires either increasing the output pressure of the primary compressor or installing a supplementary compressor in the gas injection circuit. This action entails both new investment and an increase in the operating costs.

In contrast, the process according to the invention, which avoids the various abovementioned disadvantages, is characterised in that the cooling of the mixture coming from the reactor is achieved by the injection of ethylene, at a pressure below that of the separator, between the pressure-reducing valve and the separator. It is applicable, and advantageous, both in the case of an autoclave reactor and in the case of a tubular reactor, in the case of a radical polymerisation using initiators of the peroxide or perester type, as well as in the case of an ionic polymerisation employing catalysts of the Ziegler type. It is applicable to a great variety of ethylene copolymers, in which the comonomer(s) may in particular be maleic anhydride, vinyl acetate, propylene and carbon monoxide, and can be present in concentration of up to 20% by weight. For this reason the words monomer and ethylene will, in the text which follows, denote both ethylene alone and mixtures of ethylene with other comonomers.

Further objects of the invention are to provide an apparatus for carrying out the process defined above and to define an injection device which makes it possible to draw the monomer at a pressure of the order of 50 bars. In fact, in the case of a number of industrial units for the manufacture of polyethylene under high pressure, which are supplied with the ethylene from the refinery under a pressure close to the critical pressure (51 bars), the possibility of introducing the fresh monomer by means of this device emerges as an essential advantage of the invention, which permits a reduction in the capacity—or even the complete omission—of the primary compressor, the usual role of which is to bring this monomer to a pressure of about 150 to 450 bars. It is even possible, by coupling several devices according to the invention, to draw this monomer at a pressure markedly below 50 bars but at a lower flow rate. The industrial value of the invention thus resides in the reduction of the investment costs and operating costs of the unit.

The invention will be better understood on referring to the figures.

Figure 3:
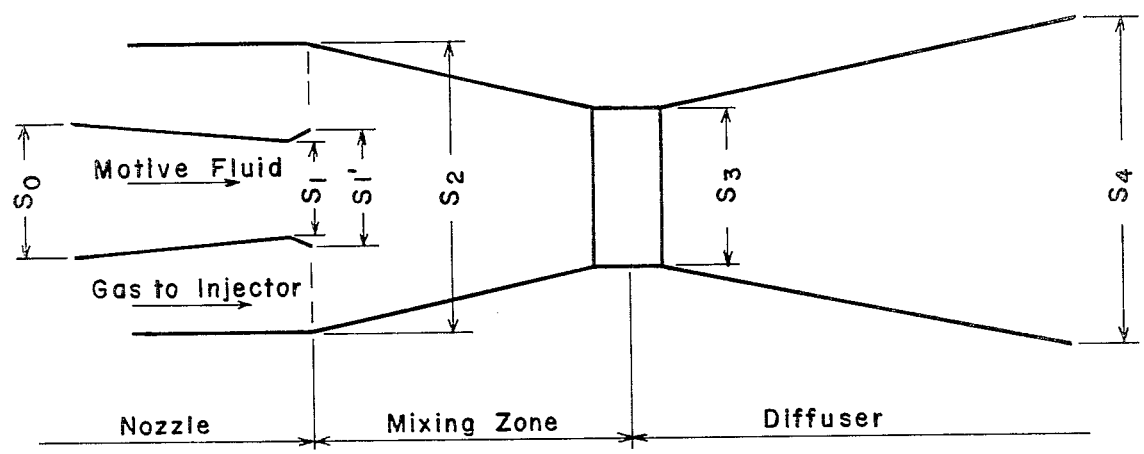

FIG. 3 represents an injection device—or injector—which is generally composed of three parts:
  an ejection nozzle of throat cross-section $S_1$, the purpose of which is to impart a certain speed to the fluid coming from the reactor at a flow rate Q, this fluid being referred to as the motive fluid;
  a mixing zone which makes it possible to draw the flow rate q of fresh or recycled monomer, referred to as drawn fluid, with the motive fluid; and
  a diffuser of throat cross-section $S_3$ the function of which is, by reducing the speed of the resulting mixture, to achieve a sufficient pressure at the injector outlet.

The nozzle is part of the inlet jet of the injection body whilst the two other parts belong to the outlet jet of same body. These pieces are preferably made of a treated steel which has a tensile strength of 100 to 160 kg/mm2.

The device according to the invention is characterised by a ratio $Q/S_1$ of between 0.20 and 1.35 t/hr.mm2 and by a ratio $(q+Q)/S_3$ of between 0.10 and 0.30 t/hr.mm2, wherein t is metric tons.

It operates as follows: the fluid issuing from the reactor is reduced in pressure at the extrusion valve and along the pipeline leading to the separator, and reaches a pressure $P_o$ upstream from the nozzle (cross-section $S_o$).

The nozzle has a geometry such that at its throat (cross-section $S_1$) the motive fluid has reached the speed of sound which causes it to flow under so-called critical conditions. The combination of mixing zone and diffuser can be compared to a converging-diverging system of special cross-sections. The transfer of the momentums between the motive fluid and the drawn fluid takes place in the converging section and the speed of the two fluids is identical at the end of the mixing zone (cross-section $S_3$). Finally, the speed of the mixture is converted to pressure in a quasi-isentropic manner in the diverging section. Throughout all these operations some energy, lost through eddies and friction, is converted into heat. One of the essential characteristics of the operation lies in the fact that the pressure at the outlet of the diffuser is regulated, because it is equal to the pressure of the separator, increased by the drop in pressure between the diffuser outlet and the separator.

The following facts allow a better understanding of the concept of the device and of the requirements regarding each of its components. Because of operating under critical conditions, the pressure $P_o$ only depends on the flow rate Q of fluid passing through the nozzle and not on the reactor pressure. On the other hand, in order to reduce the injection pressure $P_2$ and/or increase the flow rate q, it is appropriate to increase the momentum of the motive fluid as it leaves the nozzle; in order to do this, it is appropriate either to fit a diverging section downstream from $S_1$ or to reduce $S_1$, but this latter solution is limited by the need of not interfering with the pressure regulation of the reactor. It was thus necessary to know the relation between $P_o$, Q and $S_1$, but this could not be correctly predicted by calculation because precise data relating to the behaviour of the monomer-polymer mixture under such conditions were lacking. We have found experimentally that the ratio $A=Q/S_1$ must be between 0.20 and 1.35 t/hr.mm2 for pressures $P_o$ of about 400 to 2,500 bars, as is shown by Table I below.

TABLE I

| A(t/hr.mm2) | 1.34 | 1.09 | 0.84 | 0.59 | 0.49 | 0.39 | 0.33 | 0.24 |
|---|---|---|---|---|---|---|---|---|
| $P_o$ (bars) | 2,500 | 2,000 | 1,500 | 1,000 | 800 | 600 | 500 | 400 |

Figure 1:
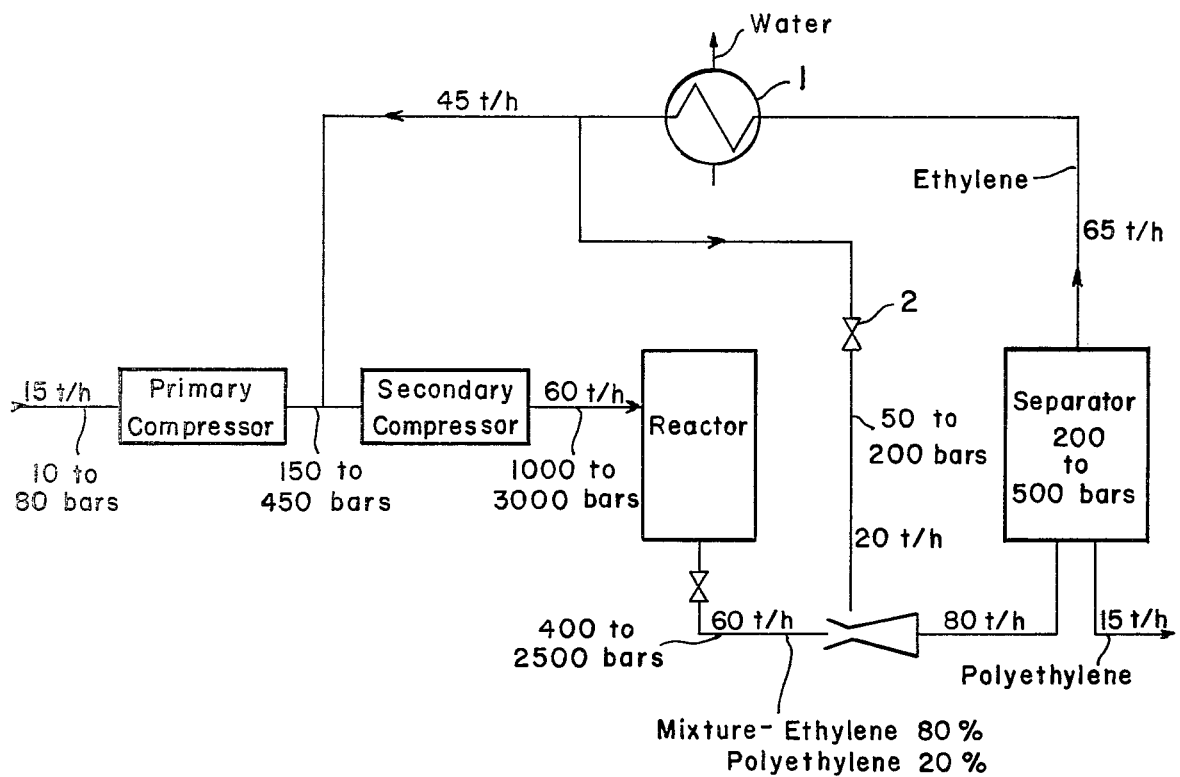
FIG. 1 represents one embodiment of the process according to the invention, in which the injected gas comes from an exchanger 1 of the recycling circuit after having been reduced in pressure through a valve 2.
Figure 2:
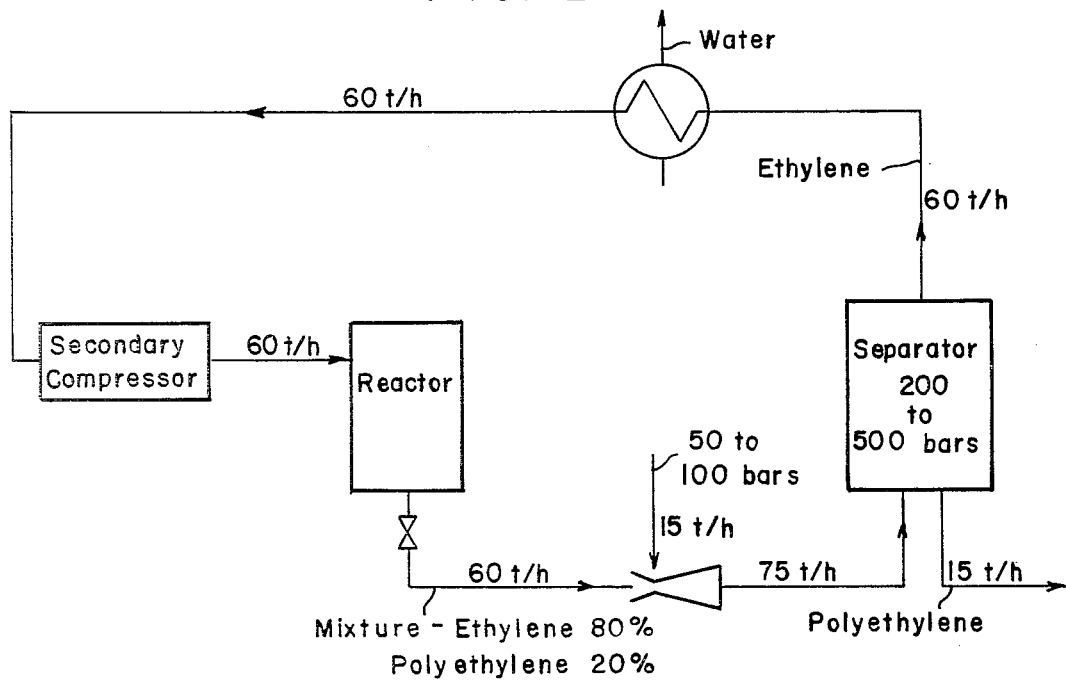
FIG. 2 represents another embodiment in which the injected gas comes from a distribution circuit under a pressure of the order of 50 bars.

The other abovementioned solution for increasing the momentum of the motive fluid consists in fitting a diverging section of outlet cross-section $S'_1$ downstream from the throat of the nozzle, as indicated in broken lines in FIG. 1, the ratio $S'_1/S_1$ of the cross-section being preferably between 1 and 1.5.

In the mixing zone, the transfer of a part of the momentum of the motive fluid to the drawn fluid takes place with a certain yield. There again, predicting a correlation between the admission pressure $P_2$ of the injected gas and its flow rate q is impossible because firstly the mixing of the two fluids takes place gradually in a zone of variable cross-section and not entirely in a zone of constant cross-section, secondly the resultant of the forces exerted by the fluids on the walls is not zero, and finally, the relatively low pressures (less than 200 bars) encountered in this zone cause the demixing of a phase which is rich in monomer and a phase which is rich in polymer. Accordingly, the conventional models of the mechanics of fluids do not provide the correct solution to this problem. In order to lower the suction pressure $P_2$, it is possible to reduce the momentum of the mixture by reducing the cross-section $S_3$ of the throat of the diffuser, the minimum value corresponding to operation at the speed of sound.

As it has just been explained in connection with the nozzle and the mixing zone, the geometry of the diffuser is also subject to certain requirements. In fact, on reducing the cross-section $S_3$ until critical conditions are achieved, a supersonic flow is created in the diverging section. This necessarily results in a shock wave located at a cross-section upstream $S_4$, so that the fluid is recompressed up to the pressure of the separator. If $S_3$ is further reduced, the flow will remain supersonic in a part of the diverging section, but the pressure upstream from the throat will increase. Consequently, the cross-section $S_3$ must not be less than a certain minimum value so as to ensure against any pressure rise in the mixing zone. Thus it has been found experimentally that the optimum value of $$B=(Q+q)/S_3$$

was between 0.1 and 0.3 t/hr.mm2 and preferably between 0.16 and 0.24 t/hr.mm2; this ratio B is a parameter which is closely related to the efficiency of the injector.

It may be recalled that for the construction of this type of apparatus it is known to choose an apex half-angle of between 2°30′ and 5° both for the nozzle and for the diffuser. Secondly, though the temperature of the fluid injected is not characteristic of the process, it is obvious that cooling the mixture issuing from the reactor will be the more efficient, the lower this temperature is. In practice, usual temperatures for the introduction of this monomer are between −20° C. and +120° C. Finally, the cross-sections can be chosen with any geometrical shape, but it will be found advantageous to choose, for the outlet cross-section of the nozzle, $S_1$ or $S'_1$ depending on the case, a shape which makes it possible to achieve the largest possible contact surface between the two fluids.

The examples which follow are intended to illustrate the invention but must not be interpreted as limiting it.

EXAMPLE 1

We shall consider an installation for the radical polymerisation of ethylene, comprising a stirred autoclave reactor operating under a pressure of 1,600 bars, at the outlet of which the temperature is 270° C. In the absence of an injector according to the invention, the temperature of the separator, which operates under 265 bars, is 290° C.

An injector comprising a nozzle of length 68 mm and circular cross-section, with diameters $\phi_o=21$ mm and $\phi_1=15$ mm, a mixing zone of length 32 mm and diameter $\phi_2=44$ mm, and a diffuser having an apex half-angle of 4°, and defined by the diameters $\phi_3=25$ mm and $\phi_4=35$ mm, is fitted onto this installation.

A series of experiments was carried out, varying the ratio q/Q whilst maintaining the total flow rate q+Q passing through the diffuser approximately constant. Under these conditions, the pressure $P_o$ upstream from the nozzle is about 500 bars, and for each experiment the injection pressure $P_2$, which will be found in Table 2 below, is determined.

TABLE II

| Experiment No. | 1 | 2 | 3 | 4 |
|---|---|---|---|---|
| Q (t/hr) | 63.8 | 63.1 | 61.5 | 56 |
| q (t/hr) | 1.25 | 3 | 5 | 9 |
| $P_2$ (bars) | 140 | 160 | 170 | 180 |

The ratio A varies, according to the experiments, from 0.32 to 0.36 t/hr.mm2 and the ratio B is 0.133 t/hr.mm2. Furthermore, the ethylene being injected at 25° C., the temperature measured at the separator is 235° C. for experiment No. 4 and 280° C. for experiment No. 1.

This shows that such an injector allows appreciable cooling of the mixture coming from the reactor whilst maintaining the injection pressure $P_2$ at a level below that previously known. This reduction in $P_2$ induces an advantageous reduction of the costs of operating the process.

EXAMPLE 2

We shall consider a polymerisation installation of the same type as in Example 1, operating under identical conditions. Another injector comprising a nozzle with diameters $\phi_o = 15$ mm and $\phi_1 = 8.5$ mm, a mixing zone of length 21 mm and diameter $\phi_2 = 27$ mm, and a diffuser with diameters $\phi_3 = 12.5$ mm and $\phi_4 = 32$ mm is fitted onto this installation.

Two experiments are carried out, keeping the flow rate Q of the motive fluid constant and equal to 23.6 t/hr; under these conditions, the pressure $P_o$ upstream from the nozzle is 650 bars and the coefficient A is 0.41 t/hr.mm2. The results of the two experiments are summarised in Table 3.

TABLE III

| q (t/hr) | $P_2$ (bars) | B (t/hr.mm$^2$) |
|---|---|---|
| 0.8 | 85 | 0.199 |
| 4.9 | 110 | 0.232 |

We claim:

1. In a process for the polymerisation or copolymerisation of ethylene in a reactor at a pressure greater than 1,000 bars, which process includes cooling the reactor effluent comprising a mixture of polymer and monomer between a pressure-reduction valve located downstream from the reactor and a separator operating at 200 to 500 bars, separating polymer from monomer in the separator and recycling separated monomer to the reactor, the improvement comprising:

(A) injecting fresh monomer into the reactor effluent between the valve and the separator at a temperature lower than that of the reactor effluent and at a pressure below that of the separator using a gas injection device comprising at least one assembly comprising (1) a convergent ejection nozzle of throat cross-section $S_1$ substantially at the downstream end of said nozzle, through which arrives at a flow rate Q, motive fluid consisting of reactor effluent; (2) a convergent mixing zone which said fluid enters after passing through said ejection nozzle to be mixed with the monomer injected, which is supplied at a flow rate q, said mixing zone at its upstream end having a larger cross-section than $S_1$; and (3) a diffuser of throat cross-section $S_3$ constituting the downstream end of said mixing zone, wherein the ratio $Q/S_1$ is between 0.20 and 1.35 t/hr.mm$^2$ and the ratio $(q+Q)/S_3$ is between 0.1 and 0.3 t/hr.mm$^2$, the pressure of said fluid entering said ejection nozzle being higher than the pressure of said separator and between about 400 and 2,500 bars and the pressure of said injected monomer being not greater than 180 bars whereby the pressure of the fluid is brought down to the pressure of the separator; and (B) substantially all of said fresh monomer for the polymerization process being supplied by its injection into the reactor effluent using said gas injection device.

2. The process according to claim 1 for the polymerization of ethylene wherein the fresh monomer injected is fresh ethylene under a pressure of about 50 bars.

3. Process according to claim 1, wherein the reactor is of the autoclave type.

4. Process according to claim 1, wherein the reactor is of the tubular type.

5. The process of claim 1, wherein the ratio $(q+Q)/S_3$ is between 0.16 and 0.24 t/hr.mm$^2$.

6. The process of claim 1, wherein the ejection nozzle is provided downstream from the throat of cross-section $S_1$ with a diverging section, extending from said throat to an outlet of cross-section $S'_1$, the ratio $S'_1/S_1$ being between 1 and 1.5, and $S'_1$ being less than the cross-section of the upstream end of said mixing zone.

7. The process of claim 1, wherein all of said fresh monomer is supplied by injection using said gas injection device.

8. The process of claim 1, wherein the fresh monomer is injected under a pressure of about 50 bars.

9. The process of claim 1, wherein the ratio $Q/S_1$ is between 0.39 and 1.35 t/hr.mm$^2$ and the pressure of the fluid entering said ejection nozzle is between about 600 and 2500 bars.

10. The process of claim 5, wherein the ratio $Q/S_1$ is between 0.39 and 1.35 t/hr.mm$^2$ and the pressure of the fluid entering said ejection nozzle is between about 600 and 2500 bars.

* * * * *